April 15, 1958     J. P. GOWLAND     2,830,396
INTEGRAL PAINT APPARATUS
Filed March 19, 1953     3 Sheets-Sheet 1

INVENTOR.
JOHN PINKNEY GOWLAND
BY H. W. Brelsford
ATTORNEY

April 15, 1958  J. P. GOWLAND  2,830,396
INTEGRAL PAINT APPARATUS
Filed March 19, 1953  3 Sheets-Sheet 2
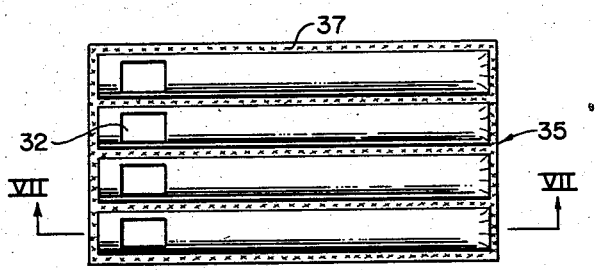
Fig. 6
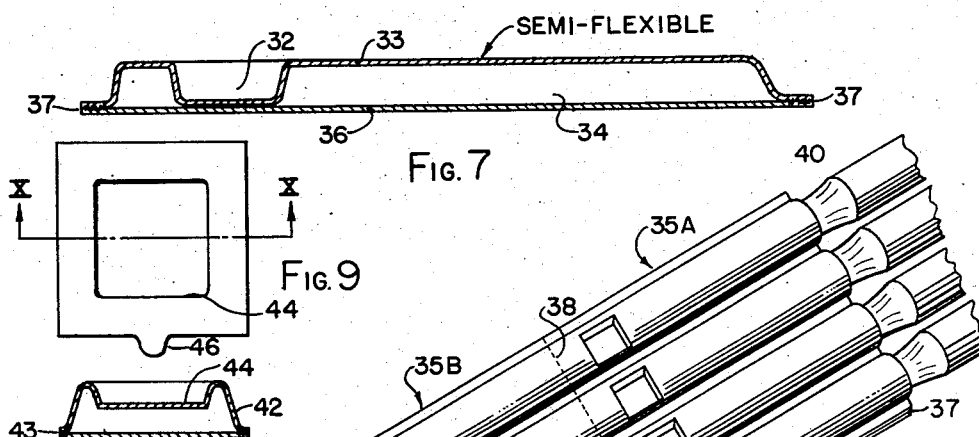
Fig. 7
Fig. 9
Fig. 10
Fig. 8
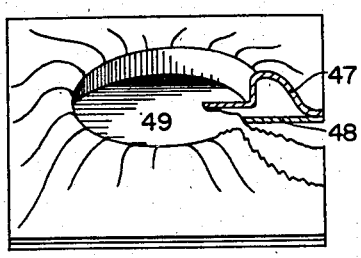
Fig. 11
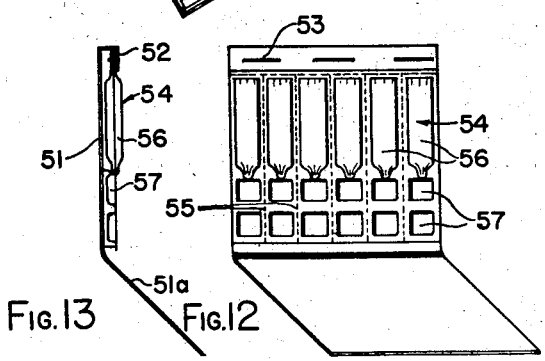
Fig. 13  Fig. 12
INVENTOR.
JOHN PINKNEY GOWLAND
BY H. W. Brelsford
ATTORNEY April 15, 1958 J. P. GOWLAND 2,830,396
INTEGRAL PAINT APPARATUS
Filed March 19, 1953 3 Sheets-Sheet 3
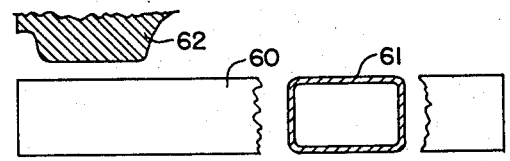
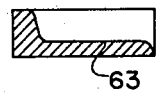
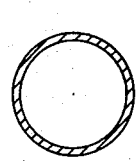
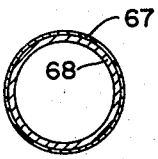
Fig. 14  Fig. 17  Fig. 18
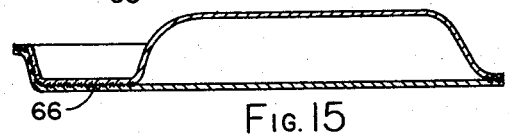
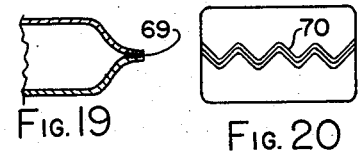
Fig. 15  Fig. 19  Fig. 20
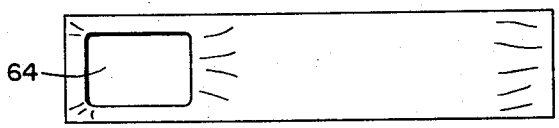
Fig. 16
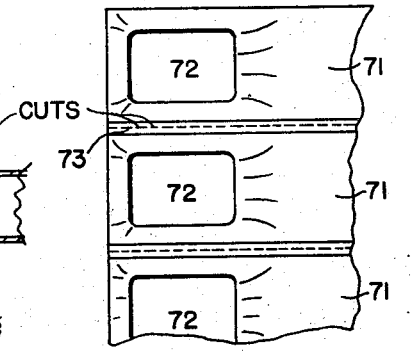
Fig. 21
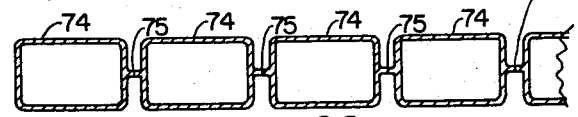
Fig. 22
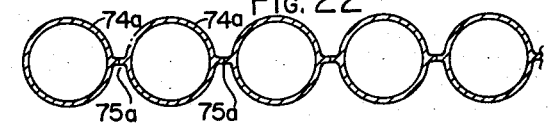
Fig. 23
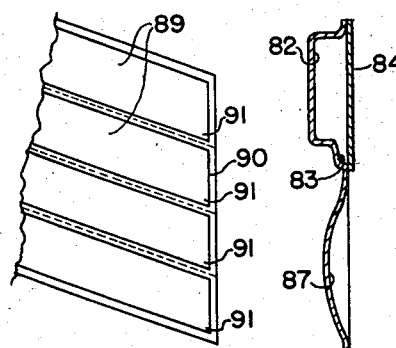
Fig. 26
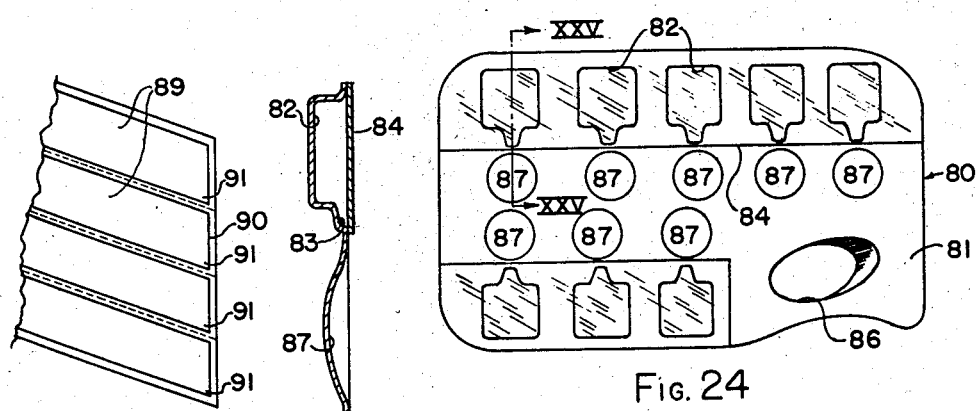
Fig. 25  Fig. 24
INVENTOR.
JOHN PINKNEY GOWLAND
BY *H. W. Brelsford*
ATTORNEY United States Patent Office 2,830,396
Patented Apr. 15, 1958

2,830,396
INTEGRAL PAINT APPARATUS

John Pinkney Gowland, Santa Barbara, Calif., assignor to Gowland & Gowland, Santa Barbara, Calif., a partnership Application March 19, 1953, Serial No. 343,458

9 Claims. (Cl. 41—5)

My invention relates to paint trays or pans and has particular reference to a combined mixing tray and paint container integrally formed from the same structural members.

Various attempts have been made to closely associate paint tubes and mixing pans in physical array to assist the use of the paints in mixing colors, thinning paint, applying paint to a brush, etc. In the past, tubes of pigment have been fastened to palettes, and pans have been secured to paint tubes. These have been unsatisfactory in practical use and in addition have been so expensive that their use has been necessarily limited.

My invention provides an inexpensive, expendable and convenient paint container and tray combination that is simple in construction. In accordance with my invention, the same structural element or member that forms the paint tray or pans may also form all or part of the paint container. The paint container, in accordance with my invention, is a flexible structure and is preferably in the form of a tube that may be manually deformed to extrude its contents. The tray or pan may be formed of a relatively more rigid material, or may be formed of a thicker section of the same material, or may be physically constructed or physically isolated from the flexible container portion to maintain its functional shape.

It is a general object of my invention to provide a satisfactory pan and container structure for paints, pigments and the like. Another object of my invention is to provide an inexpensive, convenient and expendable pan and container combination.

Another object is to provide a paint container and pan combination formed of the same structural members.

Another object is to provide a pan and flexible tube combination wherein these elements of the combination are formed from a single structural member.

Another object is to provide a paint container having a pan integrally formed in the top thereof.

Still another object is to provide structures employing multiple tubes and multiple pans formed from the same structural element.

Other objects and advantages of my invention will be apparent in the following description and claims considered together with the accompanying drawings in which:

Figure 1:
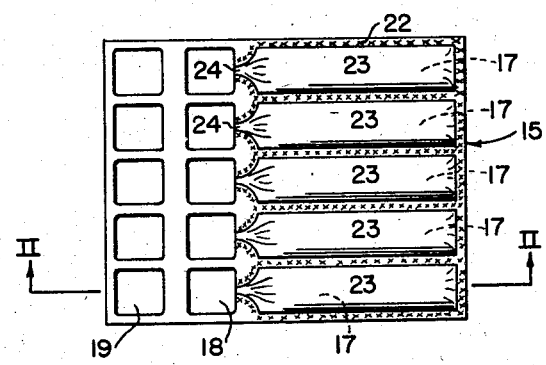
Fig. 1 is a plan view of a presently preferred embodiment of my invention.
Figure 2:
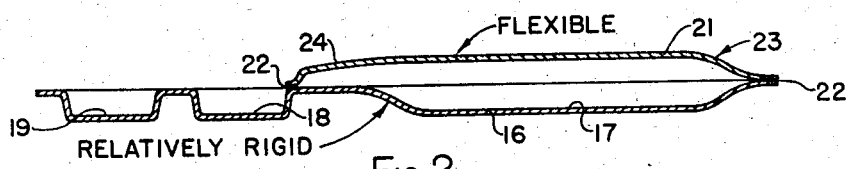
Fig. 2 is a sectional view on an enlarged scale along the line II—II of Fig. 1.
Figure 5:
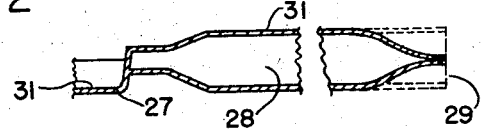
Figure 3:
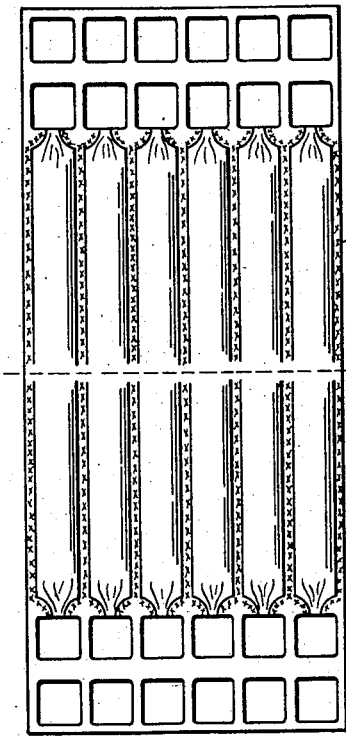
Figure 4:
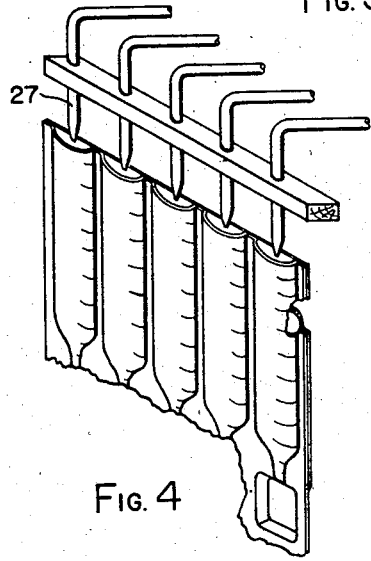

Fig. 3 is a plan view of a double structure similar to Fig. 1 but illustrating one method of forming the structures of Fig. 1, Fig. 4 is an isometric view of one of the structures of Fig. 1 being filled and prior to sealing of the paint containers, Fig. 5 is a fragmentary view in section similar to Fig. 2 but of a modified form of the invention as constructed by molding or similar processes, Fig. 6 is a plan view of a modified form of the invention wherein the paint pan is depressed within the paint tube, Fig. 7 is an enlarged sectional view along the line VII—VII of Fig. 6, Fig. 8 is an isometric view of an aligned plurality of the structures of Fig. 6 showing one method of supplying paint to these structures, Fig. 9 is a plan view of a small size of structure similar to Fig. 6, Fig. 10 is a sectional view along the line X—X of Fig. 9, Fig. 11 is a perspective view with portions broken away of a modified form of the invention employing a circular recess, Fig. 12 is an isometric view of a modification of the invention showing tubes and pans disposed in a cover, Fig. 13 is a side view of the device of Fig. 12, Fig. 14 is an elevation view of a tubular member, with parts broken away to show the section, about to be formed between die parts, Fig. 15 is a sectional view of the tube of Fig. 14 after forming and closing, Fig. 16 is a plan view of the device of Fig. 15, Fig. 17 is a sectional view of a modified form of tubing for use with the device of Fig. 14, Fig. 18 is a sectional view of a modified form of tubing for use in the invention showing metal adhered to plastic so that the tubular elements may be permanently deformed when extruding contents, Fig. 19 is a sectional view of a modified form of closure for the tube of Fig. 15, Fig. 20 is an end view of a modified form of closure for tubes showing zigzag closure lines to prevent spreading upon closure, Fig. 21 is a plan view similar to Fig. 16 showing multiple elements formed together, Fig. 22 is a sectional view through multiple tubing for use with the device of Fig. 21, Fig. 23 is a sectional view of multiple tubing of circular cross section for use with the device of Fig. 21, Fig. 24 is a plan view of a painter's palette showing pigments permanently disposed in the palette, Fig. 25 is an enlarged sectional view along the line XXV—XXV of Fig. 24, and Fig. 26 is a plan view of multiple tubing cut on a bias to provide puncture tips.

Referring to Figs. 1 and 2 the entire tube and pan arrangement may be referred to generally by the numeral 15. A single structural element 16 preferably in sheet form may have an elongated recess 17 formed therein as well as a pan recess 18. In some types of paint applications a second mixing pan is desirable and accordingly the sheet 16 may have pans 19 formed therein. A plurality of such recesses 17 and pans 18 and 19 may be formed on the single sheet of material 16 as illustrated best in Fig. 1. The containers for the paints or pigments may be completed by placing over the various recesses 17 a sheet of material 21 which may be welded or otherwise secured to the sheet 16 at the places indicated by the cross marks 22 representing the lines of attachment, particularly when heat sealing or fusion is employed. The sheet 21 may be bellied upwardly before the fusion is completed, or if desired, may be embossed or pressed so as to form a permanent upwardly extending recess in the sheet 21 to match the aligned recesses 17 in the sheet 16.

From the foregoing it will be apparent that the sheets 16 and 21, together with the fusion portions 22 define a series of elongated containers or tubes hereby designated by the numeral 23. While the particular shape of these tubes is not a necessary part of my invention, at present I prefer to form small projecting snouts on these tubes which preferably may be defined by the fusion lines 22. Accordingly, the portion of the tube 23 nearest the pan 18 may be reduced in cross section to form a projecting snout 24. These snouts 24 form a suitable point at which the tube 23 may be punctured by any sharp instrument and thereupon manual deformation of the top sheet 21 will extrude the contents of the tube through such puncture. The contents of the tube may be more completely extruded therefrom if the portion of sheet 16 immediately underlying the snout 24 is flat as illustrated in Fig. 2.

I prefer at present to form the device of Figs. 1 and 2 from organic plastic material of the thermoplastic type. A large variety of the presently available plastic materials may be used and particular types will be more desirable than others depending upon the chemical composition of the paint or pigment employed. The sheet 16 is preferably embossed to form the various depressions or recesses 17, 18 and 19 but various technics other than embossing or drawing may be employed. The sheet 16 may be relatively rigid if desired compared to the top sheet 21 which is preferably flexible so that it may be manually depressed toward the recess 17 to extrude the contents through a puncture of the snout 24. The seal 22 may be simply effected by means of a heat seal in accordance with current commercial practice. The use of thermoplastic materials facilitates this heat seal and avoids the necessity of cement or other joining technic. The relative flexibility between sheets 17 and 21 may be obtained in a large variety of manners such as different chemical composition, different plasticizers, different thicknessses of material and mechanical structure rendering one more rigid than the other. While this difference in flexibility between the two sheets is desirable it is not absolutely necessary.

One method of forming the device of Figs. 1 and 2 is illustrated in Fig. 3 wherein it will be noted that two such devices 15A and 15B may be formed as a single unit. The sheet 16 for both units accordingly may be formed on a single die and a large sheet 17 adhered thereto to complete both units 15A and 15B except for the heat seal on the end of the tubes 23 remote from the pans 18. The assembly of the two halves 15A and 15B may then be cut in two along a line 26. The unsealed end of each tube will be open because the normal bellying effect of the sheet 21 will form an opening for the tube as most clearly illustrated in Fig. 4. The tubes may then be disposed beneath an alignment of filling nozzles 27 for filling with an assortment of paints, pigments or combination of paints, thinners and glue, etc. required for a particular application. The provision of a plurality of tubes in one unit permits this quick filling of the tube or container portions with a large variety of colors or other materials. This materially increases the rapidity of manufacture. After filling, the open ends of the tubes may be heat sealed in any suitable fashion.

Illustrated in Fig. 5 is a modification of the invention wherein the entire open end tube structure is formed as an integral unit. This is preferably done by a molding technic and accordingly a single piece of material 27 may be so molded as to define a tube 28 having one end formed open as shown by the part in broken outline. After filling this open end may be closed and heat sealed as at 29. A suitable pan recess or recesses 31 may be integrally formed at the same time as the tube 28. In such a structure the material, of course, will be homogeneous and where the upper surface of the tube 28 is to be made more flexible this may be accomplished by making the upper surface thinner as at 31.

Illustrated in Figs. 6 and 7 is a modification of the invention wherein a pan recess 32 is formed in the upper sheet 33 of material forming a tube enclosure 34 with a bottom sheet 36. The upper sheet 33 with the recesses 32 formed therein are preferably preformed before assembly to the bottom sheet 36. This assembly may be accomplished by means of fusion or heat seals 37 or any other suitable seal. The material of sheet 33 may be semiflexible so that it can be readily deformed and yet may have sufficient rigidity to retain the shape of the recess 32. Material may be disposed in the recess or pan 32 by puncturing the bottom or side of the pan and then extruding paint or pigment into it.

One method of filling the tubes of Figs. 6 and 7 is illustrated in Fig. 8 wherein it will be noted that a large number of such tube assemblies 35A, 35B, 35C, etc. may be formed in end to end relation with the tubes open between the different sections. Nozzles 40 may be inserted into the respective tubes and pigment, paint, etc. may be forced into the tubes by pressure. When the paint reaches the end of the open tube the nozzles may be removed and the different sections of the tubes heat sealed to terminate them whereupon the assemblies may be cut along the weld lines of closure of the tubes to form the completed assembly 35 as shown in Figs. 6 and 7. These welds and cuts may be along the broken lines 38 illustrated in Fig. 8.

Illustrated in Figs. 9 and 10 is a modification of the invention wherein the paint container is not elongated. A bottom sheet 41 may have a dished upper member 42 heat welded or otherwise secured to it at 43. The dished member 42 may have a paint tray or pan 44 formed centrally therein and a projecting snout 46 may be formed on one edge from material of both members 41 and 42. The bottom of the pan 44 may be spaced from the sheet 41 to give volumetric capacity which volume in turn may be filled with a suitable paint, pigment, glue, thinner or other material which may be used.

The device of Figs. 9 and 10 may be filled by any suitable process including the process illustrated in Fig. 8. In use, the projecting snout 46 may be punctured and the pan or the dished member 42 may be manually deformed to extrude the contents which may be applied by a brush into the pan 44. Various materials of construction may be employed including thermoplastic organic materials.

Illustrated in Fig. 11 is a modification of the invention which is similar to that of Figs. 9 and 10 except that the pan in this event may be circular. Accordingly, a dished member 47 may be secured at its edges to a bottom member 48 and the contents confined between them. A circular pan 49 may be embossed or otherwise formed in the dished member 47. In use, the pan 49 may be punctured at its bottom and the entire device manually deformed to extrude the contents through the puncture into the pan.

Illustrated in Figs. 12 and 13 is a modification wherein the tubes and integral pans may be made small in size and easily separable. A backing member 51 of sheet material may have one edge turned in as at 52 to which may be secured, as by staples 53, a multiple tube and pan assembly 54 having tubes 56 and pans 57 of any desired construction, such as that of Fig. 1. Intermittent cuts 55 may be made between each tube and between the staples 53 and the tubes so that each tube with pans attached may be manually torn loose from the entire assembly. Perforations could likewise be used but cuts are presently preferred. The device may be protected when not in use by folding over one end 51a of the backing sheet.

The device of Figs. 12 and 13 may be small in size if desired on the order of the size of safety match containers and the construction of the tube assembly 54 may be similar to that previously described in connection with Fig. 1, including the provision of snouts, or may be molded as in Fig. 5, or formed in any other fashion. In use, the snouts need merely to be punctured and the contents extruded whereupon they may be brushed into the adjacent mixing pans 57.

Referring to Figs. 14, 15 and 16 there is illustrated a tube 60 which may be formed of any suitable pliable material whether metallic or non-metallic but I prefer at present to use a tube of thermoplastic organic plastic material. This tube 60 may have any desired cross section and may be generally rectangular if desired as shown at 61. An upper die member 62 may collapse one end of the tube 60 into a lower die member 63 to form a pan member 64 as shown in Fig. 15. After the tube 60 is filled with pigment, paint, thinner, glue, etc., the other end may be similarly collapsed and closed as at 65. The plan view is shown in Fig. 16 wherein it will be noted that the pan 64 may be generally rectangular although any desired shape could be formed.

The combined tube and pan of Figs. 14, 15 and 16 may be formed of thermoplastic material in which case the upper and lower walls of the tube 61 may be welded together as at 66. Thus, even though the particular tube material may not be subject to shaping as by embossing or drawing, nevertheless the pan 64 will retain its shape because of the double walled construction wherein the walls are welded together. The same shaping is, of course, possible on the closure 65. This construction makes possible the forming of tube and pan combinations from inexpensive extruded tubing of almost any thermoplastic material. Where metals are employed the thermo welding feature is not important, but if desired, spot welding may be used. In use, the end of the tube adjacent to the pan 64 may be punctured and manual deformation of the tube will extrude the contents into the pan for use.

Illustrated in Fig. 17 is a tubular member of circular cross section which may be used as previously stated for the tubing formed as shown in Figs. 14-16.

Illustrated in Fig. 18 is a tube wherein the outer part may be formed of a deformable metal 67 and the inside may be formed of an organic plastic 68. The metal 67 when manually deformed maintains the shape to which it is deformed, thus overcoming the tendency of a tube of plastic material to resume its tubular shape after the deforming source has been removed. Such plastic coated metals are commercially available and their use in the forming of pans and tubes in accordance with the invention makes possible low temperature sealing at the softening temperature of the plastic rather than using the very high spot welding temperatures necessary for metals. Also sheets of metal and plastic can be used in place of plastic sheets.

Illustrated in Fig. 19 is a closure 69 for the tube of Fig. 15 wherein the tube is sealed along a median line rather than at a line along one or the other tube walls. If such a median seal is employed with a straight line closure the tube will spread out in fishtail fashion thus complicating packaging. Such a fishtailing action may be avoided by sealing a tubular member along a zigzag line 70 as shown in Fig. 20.

The construction of Figs. 14-16 may be applied to multiple tubing as shown in Fig. 21. There, tubes 71 of any desired cross section may be suitably collapsed at one end to form pans 72. Preferably, the juncture material between the tubes 71 should be weakened by intermittent cuts 73 so that one tube 71 may be easily broken or torn loose from the other tubes. Perforations or rouletting may be employed also.

Illustrated in Fig. 22 is a multiple tube construction for forming the device of Fig. 21 which multiple tubes may be formed in any desired way as by extruding or molding. Thus, tubes 74 may be joined by webs 75 to form a continuous structure of any desired number of aligned tubes. The weakening cuts or perforations may be applied to the web 75. The structure of Fig. 23 is similar to that of 22 except that the tubes may be circular in cross section illustrating the fact that tubes of any desired cross section may be employed.

Illustrated in Figs. 24 and 25 is a painter's palette 80 formed of a sheet of material 81 having a plurality of paint recesses 82 formed in rows preferably about the exterior of the sheet 81. These recesses may have any desired outline but preferably at one point include a small neck 83. The recesses 82 may be filled with any desired paint, pigment, thinner, glue, etc. and thereafter a strip or ribbon 84 may be passed over all of the paint recesses to enclose the contents of the recesses. This strip 84 may be transparent so that the contents may be readily observed and also may be ductile so that it may be manually depressed into the recesses to extrude the contents of the recesses through a suitable puncture, without resuming its initial planar condition. This prevents the sucking of air into the recesses, avoiding hardening of the pigment or paint. The puncture is preferably opposite the neck 83 of the recesses to permit complete extrusion of the contents of the recesses.

The sheet 81 of Fig. 24 may have the usual thumb aperture 86 and may also be formed with one or more shallow recesses 87 in which colors may be mixed. Pigments and paints, of course, may be mixed on the flat surface also of the palette 80.

Illustrated in Fig. 26 is an aligned plurality of tubes 89 which may be of any suitable construction and filled with paint or pigment. The tubes 89 may be closed along a line 90 at an acute angle to the tubes so that a sharp point 91 is formed on each tube presenting a suitable puncture point for extrusion of the contents. Such tubes may be formed of any desired material including thermoplastic plastics and may be separated by tearing along intermittent cuts.

My invention provides an inexpensive but reliable pigment and pan combination which may be expendable because of its low cost construction. For this purpose it is ideally suited for packaging with construction kits, paint sets or other articles having a definite paint requirement. When used with construction kits one or more of the tubes may be provided with glue, thinner, or other materials required in addition to paint. The use of a single structural element for the pans and the tube not only facilitates manufacture and renders the product less expensive, but also simplifies packaging problems permitting the entire device to be placed in a shipping box with the article to be painted, without any special means of protection. This is in contrast to most pigment tube assortments wherein protection of the tubes is necessary from the other articles. Also, other prior art devices required physical means for attaching tubes adjacent to mixing pans. The provision of multiple tubes and multiple pans in one assembly makes possible the interaction between the tubes and pans necessary for mixing paints of different colors to obtain the desired tints and shades.

While I have described my invention with respect to specific embodiments thereof I do not limit myself to these embodiments as they are merely illustrative of the invention and not limiting. Accordingly, I claim all such variations as fall within the true spirit and scope of my invention.

I claim:

1. An artist's paint set comprising: a plurality of manually deformable tubes joined side by side in a plane; a pan integrally formed at one end of each tube and having its bottom disposed approximately in the plane; and a flexible snout of puncturable material formed at the pan end of each tube and terminating at the associated pan, whereby puncturing the snout will permit extrusion of contents into the pan when manual pressure is applied to the tube and the flexible snout puncture will self seal by its contents when the manual pressure is removed.

2. The device of claim 1 in which a second pan is located adjacent each said pan for separate mixing of paints as a palette.

3. The device of claim 1 comprising two sets of said manually deformable tubes and pans, said two sets being arranged with their ends remote from said pans separably joined along a line of perforations.

4. The device of claim 1 in which the pans and the lower portions of the tubes consist of a single sheet of material and the other part of the tubes consists of a second single sheet of material.

5. The device of claim 4 in which the pans and the lower portions of the tubes are depressions in said single sheet of material.

6. An artist's paint set comprising: a plurality of manually deformable containers joined side by side in a plane; a pan integrally formed at one end of each container and having its bottom disposed approximately in the plane; and a flexible snout of puncturable material formed at the pan end of each container and terminating at the associated pan, whereby puncturing the snout will permit extrusion of contents into the pan when manual pressure is applied to the container and the flexible snout puncture will self seal by its contents when the manual pressure is removed.

7. The device of claim 6 in which a backing member of foldable material is secured to said device adjacent the ends of said containers, said backing element being foldable about said tubes and pans to form a cover when said device is not in use.

8. An integral artist's paint set comprising: a plurality of manually deformable containers joined side by side in a plane; a pan integrally formed at one end of each container and having its bottom disposed approximately in the plane; the ends of said deformable containers adjacent said pans being of puncturable flexible material whereby the contents of said containers may, upon puncturing thereof, be extruded into the adjacent pan when manual pressure is applied to the container.

9. An artist's painting set having an assortment of painting colors and a number of mixing pans comprising: a first integral structural member shaped to form part only of a plurality of paint containers and formed with a plurality of mixing pans immediately adjacent each of the paint container parts; a second structural member sealed to said first member and completing the said plurality of paint containers; at least one of said members being of manually deformable material; and a deformable portion of said one of said structural members being readily puncturable, whereby the user may selectively puncture a container adjacent a pan to extrude paint therefrom into the pan by manually deforming the container, and may mix various paint colors from adjacent pans.

References Cited in the file of this patent

UNITED STATES PATENTS

| | | |
|---|---|---|
| 736,185 | Williams | Aug. 11, 1903 |
| 825,266 | Donaldson | July 3, 1906 |
| 1,920,467 | Jarrett | Aug. 1, 1933 |
| 2,195,740 | Salfisberg | Apr. 2, 1940 |
| 2,513,852 | Donofrico | July 4, 1950 |
| 2,530,306 | Land | Nov. 14, 1950 |
| 2,544,020 | Hoag | Mar. 6, 1951 |
| 2,578,444 | Nicolle | Dec. 11, 1951 |